ELECTROLYTIC HONING DEVICE

Original Filed Oct. 29, 1962 4 Sheets-Sheet 1

INVENTOR
John H. Greening,
BY
James H. Bowen
ATTORNEY

ELECTROLYTIC HONING DEVICE

Original Filed Oct. 29, 1962 4 Sheets-Sheet 2

INVENTOR
John H. Greening,
BY
James H. Bower
ATTORNEY

ELECTROLYTIC HONING DEVICE

Original Filed Oct. 29, 1962 4 Sheets-Sheet 3

INVENTOR
John H. Greening
BY
James H. Bowen
ATTORNEY

ELECTROLYTIC HONING DEVICE

Original Filed Oct. 29, 1962 4 Sheets-Sheet 4

INVENTOR.
John H. Greening.
BY
James H. Bower
ATTORNEY

United States Patent Office

Re. 26,499
Reissued Dec. 3, 1968

26,499
ELECTROLYTIC HONING DEVICE

John H. Greening, Birmingham, Mich., assignor, by mesne assignments, to Micromatic Hone Corporation, Detroit, Mich., a corporation of Michigan Original No. 3,267,018, dated Aug. 16, 1966, Ser. No. 233,772, Oct. 29, 1962, which is a continuation-in-part of Ser. No. 811,914, May 8, 1959. Application for reissue Mar. 14, 1967, Ser. No. 626,649
14 Claims. (Cl. 204—217)

Matter enclosed in heavy brackets [ ] appears in the original patent but forms no part of this reissue specification; matter printed in italics indicates the additions made by reissue.

*ABSTRACT OF THE DISCLOSURE*

*An electro-chemical honing apparatus having a rotatable and reciprocable cathode body with a plurality of honing stones carried by said body in an electrically nonconductive relation to said cathode body and movable against the work surface of a bore to remove the metal oxides left on the surface by electrolytic action.*

This *application is a reissue application of my Patent 3,267,018 issued Aug. 16, 1966, which* application is a continuation-in-part of my prior copending application Ser. No. 811,914, filed May 8, 1959, now abandoned.

This invention relates to the honing art and particularly to a honing device and method in which material is removed from a work surface by the combined action of abrasive stones and a deplating electrolytic current.

It is an object of the present invention to provide an abrading machine and tool in which the speed, efficiency and quality of the abrasive process are enhanced by an electrolytic current flowing from the workpiece to a cathode member to etch the surface of the workpiece and thereby render more efficient the action of the honing stones.

It is another object of the present invention to provide an abrading device of the above character in which a large amount of electrolytic coolant may be passed between the cathode member and the work surface thereby permitting the usage of large currents without "boiling out" the electrolytic coolant.

It is still another object of the present invention to provide an abrading device of the above character in which the abrasives may be continuously advanced during the abrading operation to compensate for the abrasive material worn away without thereby altering the spacing between the cathode member and the work surface or producing a consequent substantial change in the level of the current flow.

It is another object of the present invention to provide a honing device of the above character by means of which the honing of very hard metals is greatly facilitated and which permits the honing of many metals which heretofore could not be honed in an economically feasible manner.

It is another object of the present invention to provide a device of the above character and a method of honing in which the rate of stock removal is substantially increased and in which the life of the honing stones is lengthened.

It is another object of the present invention to provide a honing device of the above character having means to maintain a constant level of current through the electrolyte as the diameter of a cylindrical work surface is changed during the honing operation.

It is a still further object of the present invention to provide a device of the above character which is efficient in operation, reliable in performance and inexpensive to manufacture.

These and other objects of the present invention will become apparent from the following detailed description taken in conjunction with the accompanying drawings in which:

FIG. 9 is a fragmentary sectional view of the structure illustrated in FIG. 8 taken along the line 9—9 thereof.

Figure 1:
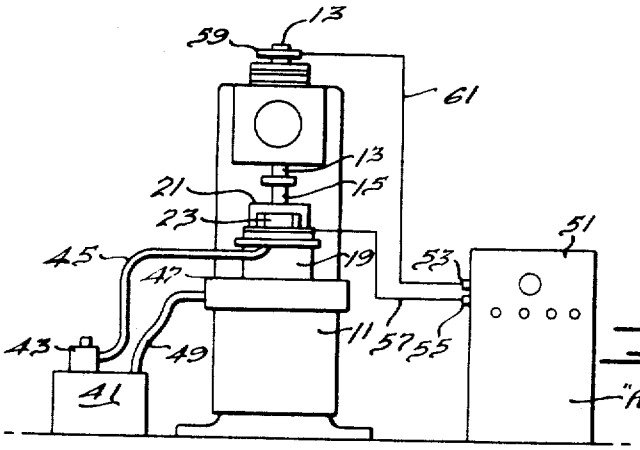
FIGURE 1 is a schematic view of a honing machine embodying the principles of the present invention.
Figure 2:
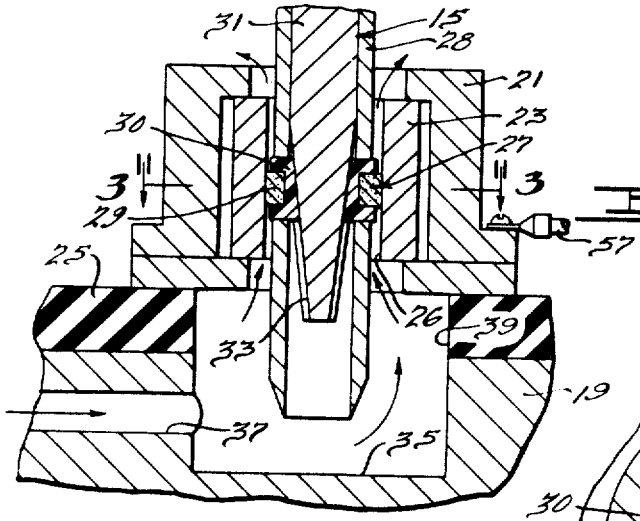
FIGURE 2 is a longitudinal sectional view of a portion of the structure illustrated in FIG. 1.
Figure 3:
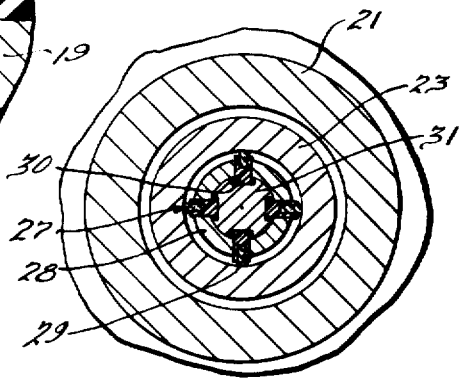
FIG. 3 is a cross-sectional view of the structure illustrated in FIG. 2, taken along the line 3—3 thereof.

The invention is illustrated herein in the form of honing apparatus for abrading cylinder bores. FIGURE 1 illustrates a honing machine 11 having a rotating and reciprocating spindle 13 to which a honing tool 15 is drivably connected. A rising fixture quill 19 is mounted beneath the tool and supports a work holding fixture 21 holding a workpiece 23 in alignment with the spindle 13. An insulating pad 25 of electrically nonconductive material is interposed between the quill 19 and fixture 21 to electrically isolate the fixture 21 and workpiece 23 from the rest of the machine 11. The workpiece 23, which is illustrated in the form of a bushing, is positioned to have its internal cylindrical surface 26 finished by the honing tool 15, which is reciprocated and rotated with respect to the bushing 23. The honing tool 15 includes a plurality of abrasive members or honing stones 27 arranged circumferentially around a hollow cylindrical honing tool body 28 and including a bonded abrasive stick 29 and a non-abrasive shell or casing 30. Each shell 30 is integrally molded around its stick 29 and covers all sides of the stick except its working face. The shell 30 is desirably made from a plastic material that wears away evenly with the stick 29 as the member 27 is consumed. The stick 29 may be made from a vitreous bonded electrically nonconductive material. It is also possible to use a metal bonded stick 29, inasmuch as the plastic shell 30, which is electrically nonconductive, insulates the stick 29 from the tool body 28. In either case, the abrasive stick 29 is in electrically nonconductive relation to the tool body 28, which forms the cathode member in the electrolytic action, as will be more fully explained. An actuating rod 31 is axially feedable within the honing tool body 28 and includes a conical lower portion 33 engageable with the abrasive members 27 to radially expand them. During the course of the honing operation, the actuating rod 31 is continuously fed in an axial direction, expanding the abrasive members 27 to compensate for the material abraded therefrom and to enlarge the work surface being honed.

The quill 19 is provided with a well 35 positioned immediately beneath the workpiece and has a port 37 communicating with the well 35 for the delivery of liquid into it. During the honing operation an electrolyte or electrolytic coolant is pumped by a pump 43 from a reservoir 41 through a conduit 45 leading to the port 37 and, thus, to the well 35. The insulating pad 25 has an enlarged aperture 39 located above the well 35 and the fixture 21 is of such construction as to permit the upward flow of electrolyte from the well 35 into the workpiece 23 through the annular passageway between the honing tool body 28 and the inner surface 26 of the workpiece. While this annular channel is blocked at places by the honing stones 27, there is more than ample room for the electrolyte to flow upwardly in the spaces between the honing stones. The electrolyte then flows out over the top of the fixture 21 and into a collecting trough 47 formed around the quill 19. From the trough 47, the electrolyte flows by gravity back to the reservoir 41 through conduit 49. While the electrolyte is electrically conductive and serves in the deplating process hereinafter described, it also functions as a coolant to dissipate heat from the workpiece.

An electrolytic power supply unit 51 is provided adjacent the honing machine proper 11 and has negative and positive output terminals 53 and 55, respectively. The power supply unit 51 functions to supply direct electrical current of a selected magnitude to the work. The positive output terminal 53 is connected by a conductor 57 to the fixture 21. The fixture 21, which is made of steel or other electrically conductive material, permits the flow of current through to the workpiece 23. From the workpiece 23 the current flows through the electrolyte to the body 28 of the honing tool, which is also of steel or other electrically conductive material. The abrasive members 27, which are electrically nonconductive with respect to the body 28, serve to center the hone body within the workpiece and prevent it from touching the workpiece. From the honing tool body the current flows up through the spindle 13 to a brush take-off unit 59, by means of which electric current is transmitted from the rotating spindle to a conductor 61 leading to the negative power supply terminal 53.

The action of the current flow is to deplate or etch material from the inner cylindrical workpiece surface 26 in contact with the electrolyte, an action which is substantially the reverse of electrolytic plating. Standard electrolytes may be used which are preferably salts of certain metals, such as sodium nitrate or potassium chloride, dissolved in water. In addition, rust inhibitors, such as sodium nitrite, may be added to the solution. It will be seen that the workpiece serves as the anode of the electrolytic cell, to which the anions of the solution are attracted. Thus, if a potassium chloride electrolytic agent is used, ferric chloride will be produced by the electrolytic process which will flow out of the workpiece with the normal flow of electrolyte and will precipitate out of the solution in the reservoir 41. The honing tool body 28 is made of steel and is such as to prevent plating of the material onto it. As the honing tool 15 rotates and reciprocates within the workpiece, the abrasive members 27 are in constant abrading engagement with the work surface 26, keeping the same clean of the film produced by the electrolytic action and thereby accelerating the electrolytic action. The electrolytic action, in turn, deplates or etches metal from the work surface in irregular channels, thereby presenting a roughened surface which is more easily abraded away by the honing stones. In addition, the roughened work surface tends to aid the gradual breakdown of the working surface of the honing stones and prevents the embedding of metallic particles from the workpiece thereon. This function is referred to as keeping the stones dressed. During the honing operation the sodium nitrite (which is the rust-inhibiting element) is acted upon by the electrolytic current to produce ammonium hydroxide, which keeps the electrolyte solution basic with a pH of between 9 and 11.

The electric current which is used in the electrolytic process is relatively low in voltage and high in amperage. For example, a current of 200 amperes at 20 volts has been found satisfactory for most honing operations. For a power supply of a given voltage, the magnitude of the current passing through the electrolyte will vary with the resistance encountered. Thus, a larger gap between the hone body 28 and workpiece 23 will produce a larger resistance, decreasing the current flow. In small diameter bores in which less than ten-thousandths of an inch of material in diameter is removed, the change in amperage will not exceed the limits for efficient operation of the machine. Thus, it has been found that using five-thousandths of an inch clearance from rough bore size to the tool body and with a current of 200 amperes at 20 volts, a total of ten-thousandths of an inch of hard-bearing steel can be removed in ten seconds.

Figure 4:
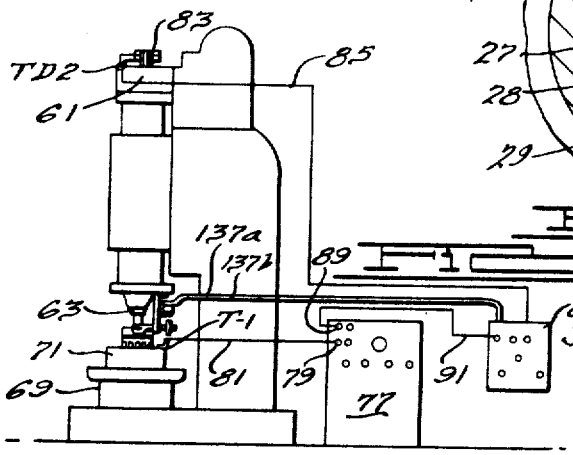
FIG. 4 is a schematic view of a honing machine illustrating another form of the present invention.
Figure 5:
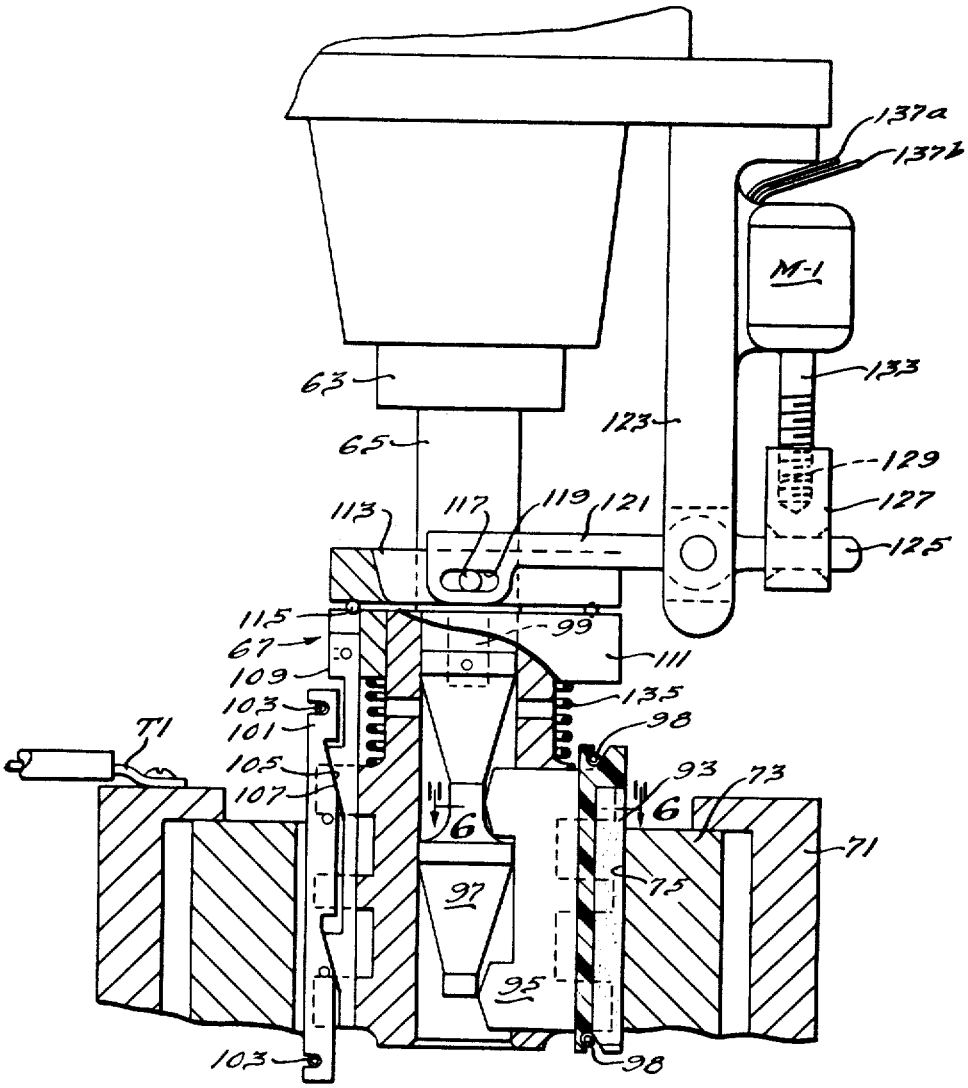
FIG. 5 is a view partly in section and partly in elevation of a portion of the structure illustrated in FIG. 4.
Figure 6:
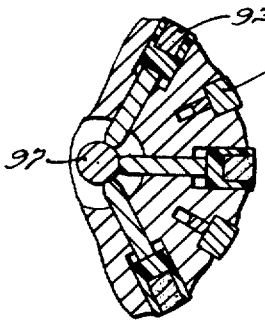
FIG. 6 is a fragmentary sectional view of the structure illustrated in FIG. 5 taken along the line 6—6 thereof.

In the honing of large diameter bores where a greater amount of stock is removed from the work surface, it is possible that the change in gap between a stationary hone body and the constantly increasing work surface can produce an undesirable drop in current flow. To overcome this disadvantage, the form of the invention illustrated in FIGS. 4, 5 and 6 provides means for expanding the hone body to maintain a substantially constant gap with the work surface. FIG. 4 schematically illustrates a honing machine 61 having a rotating and reciprocating spindle 63 to which the drive shaft 65 of a honing tool 67 is drivably connected. The machine is provided with a rising quill 69 on which a work holding fixture 71 is supported so as to hold a workpiece 73 in alignment with the tool 67 for finishing of its internal cylindrical work surface 75. An electrolyte is pumped between the tool 67 and work surface 65 in a manner similar to that described in the prior embodiment. In addition, an electrolytic power supply unit 77 has its positive outlet terminal 79 connected to terminal T1 on the work holding fixture 71 by means of a conduit 81. The fixture 71 is in direct physical contact with the workpiece 73 and, therefore, current is free to flow to the workpiece 73 and then through the electrolyte to the honing tool 67. From the honing tool 67 the current flows up the drive shaft 65 to the machine spindle 63. The upper end of the spindle 63 is provided with a brush take-off unit 83 through which the current flows to conduit 85, which is in turn connected to a servo-amplifier unit 87. From the servo-amplifier unit 87 the current flows to the negative outlet terminal 89 of the power supply unit 77 by means of a conduit 91. The servo-amplifier 87 serves to control the expansion and contraction of the honing tool 67 in response to changes in amperage of the current flowing through the circuit from the power supply unit 77.

The honing tool body includes a plurality of abrasive stones 93 spaced about its periphery which are in abutting engagement with inwardly extending cam shoes 95. The stones 93 are radially expandable by a double cone element 97 against the bias of a pair of garter springs 98. During the honing operation an actuating rod 99 connected to the double cone element 97 is progressively fed downwardly to radially expand the stones 93, thereby compensating for the material abraded from the surface of the stones and continuously enlarging the work surface being honed. Spaced about the periphery of the honing tool between the honing stones 93 are a plurality of cathode shoes 101 which are biased radially inwardly by garter springs 103. Each cathode shoe has a pair of inclined surfaces 105 which are engageable by similarly inclined cam surfaces 107 on cathode expansion members 109. A collar 111 surrounds the upper end of the tool body and has an abutting relationship to the upper ends of the cathode expansion members 109. Disposed above the collar 111 is a nonrotatable ring 113 connected to collar 111 by ball elements 115. A pair of pins 117 project oppositely outwardly from the ring 113 and are received in elongated slots 119 formed in opposite sides of a fork lever 121. The lever 121 is pivotally connected to a bracket 123 secured to a reciprocating but nonrotating portion of the honing machine. The rear end 125 of the arm 121 supports a block 127 having an internally threaded bore 129 formed in the upper end thereof. An electric servo motor M–1 also supported on the bracket 123 drives a screw element 133 threadedly engaged in the block 127. Rotation of the screw element 133 in opposite directions by means of the motor M–1 thereby raises and lowers the block 127 in order to move the forward fork end of the lever 121 in the opposite vertical direction. Downward movement of the forward end of the lever 121 transmits downward pressure to the nonrotatable collar 113, which transmits similar downward pressure through ball elements 115 to the collar 111. Collar 111, in turn, forces the cathode expander elements 109 downwardly to cause radial expansion of the cathode shoes 105. Raising of the forward end of the arm 121 relieves the pressure of the cathode expansion members 109 on the cathode shoes 105 and permits their collapse under the bias of the garter springs 103. This collapsing action is further aided by a coil spring 135 biasing the collar 111 upwardly. The motor M–1 is wired to the servo-amplifier system by conductors 137A and 137B and its operation is controlled thereby in response to the current flowing through the electrolyte from the electrolytic power supply unit 77. For a power supply of any voltage, the magnitude or amperage of the current passing through the system is dependent upon the resistance present in the circuit. As material is removed from the surface of the workpiece 73, the gap between the cathode shoes 105 and the work surface 75 will increase and, thus, the current has a longer distance to travel through the electrolyte. Thus, the resistance offered by the electrolyte is increased and this increased resistance causes a consequent drop in the magnitude of the current in the circuit. The servo-amplifier 87 serves to compare this current to a preselected value in order to expand or contract the cathode shoes 105 by driving of the motor M–1 in the appropriate direction.

Figure 7:
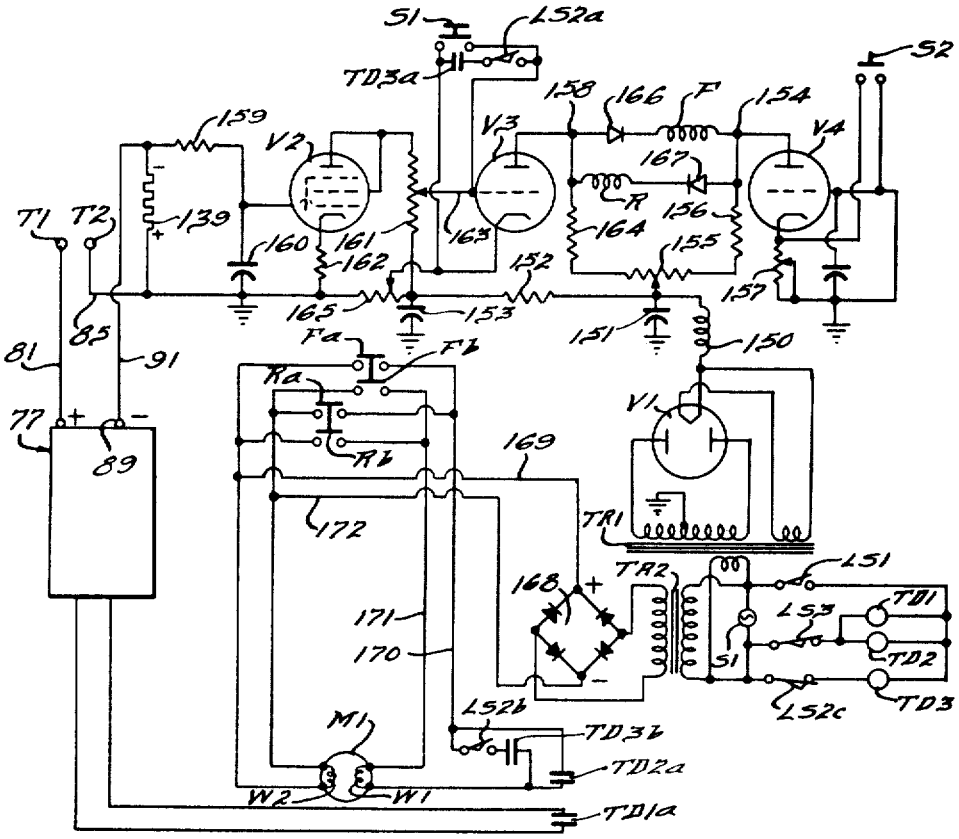
FIG. 7 is a schematic representation of a portion of the control circuitry for the structure illustrated in FIG. 4.

The control circuitry for the machine of FIGS. 4 through 6 is illustrated in FIG. 7 and includes limit switch LS1, limit switch LS3 and limit switches LS2a, LS2b and LS2c. Limit switch LS1 is normally open and is closed when the honing tool reaches its lower position and is disposed within the workpiece in preparation for the honing operation. Limit switch LS1 may also initiate operation of the spindle motor to produce rotation of the honing tool. Limit switch LS3 is controlled by suitable gauging mechanism such as is shown in my prior application, Serial No. 672,740, now Patent No. 3,010,259 issued Nov. 28, 1961, entitled "Bore Gauging Device." Limit switch LS3 is closed at all times except when the gauging mechanism of the honing machine indicates that the workpiece has reached proper size. Limit switches LS2a, LS2b and LS2c are controlled by the honing tool, limit switches LS2a and LS2b being opened at all times except when the tool is fully raised and limit switch LS2c being closed at all times except when the tool is fully raised. Limit switches LS2a, LS2b and LS2c are tripped at the same instant and may in fact be plural contacts of a single limit switch mechanism if desired.

The operational cycle is initiated with the tool 67 fully raised and with the stones 93 fully retracted. As a result, limit switch LS1 is open, limit switch LS3 is closed, limit switches LS2a and LS2b are closed and limit switch LS2c is open. As the tool starts down into the workpiece, limit switches LS2a and LS2b are opened and limit switch LS2c is closed. The opening of limit switches LS2a and LS2b disables certain circuits to be described and the closure of limit switch LS2c prepares an energizing circuit to be described. When the tool reaches its fully down position, limit switch LS1 is closed. As a result, energizing circuits for time delay relays TD1 and TD2 are completed from source S1 through limit switches LS1 and LS3. Time delay relay TD1 is provided with a pair of normally open contacts TD1a which close a timed interval after the energization of relay TD1, such as, for example, a few seconds. The closure of relay contacts TD1a energizes the electrolytic power supply 77 which produces a direct voltage between conductors 81 and 91. Relay TD2 is provided with a pair of normally open contacts TD2a which are closed a timed interval after the energization of the winding of relay TD2, this timed interval desirably being slightly greater than the delay period of relay TD1. The closure of contacts TD2a prepares an energizing circuit for the armature winding W1 of D.C. servo motor M–1.

Concurrently with the energization of relays TD1 and TD2, the honing tool begins to rotate and the conventional feed mechanism (not shown) begins to move the actuating rod 99 downwardly to expand the honing stones 93. At the same time, the electrolyte flows between the work surface 75 and the cathode shoes 105, acting as a coolant for the honing stones 93. The energization of the power supply unit 77 and the preparation of the energizing circuit for motor M–1 desirably occurs after a few seconds of the honing cycle have elapsed.

The voltage between conductors 81 and 91 developed by the power supply 77 produces a conventional current flow from conductor 81, terminal T1, through the fixture 71 (FIG. 5), through the workpiece 73, through the electrolyte to the cathode shoes 105, through the honing tool 67, drive shaft 65, spindle 63, brush take-off 83, terminal T2, conductor 85 (which is grounded), current sensing resistor 139 (having a value of, for example, 0.005 ohm), and to the return conductor 91. The voltage drop appearing across resistor 139 varies in accordance with the current therethrough and hence in accordance with the current through the electrolyte. The function of the servo system is to compare this voltage to a reference voltage and to continuously adjust the workpiece-to-cathode-shoe-spacing so as to maintain the voltage across resistor 139 in a preselected relationship with the reference voltage.

The servo amplifier includes vacuum tubes V2, V3 and V4 which are supplied with plate voltage by means of a power supply including power transformer TR1 (energized from source S1), full wave rectifier V1, choke input filter including inductor 150 and capacitor 151 and a further isolating and filtering network including resistor 152 and capacitor 153.

The magnitude of the reference potential at point 154 is established by means including vacuum tube V4, the anode of which is supplied with plate voltage through potentiometer 155 and plate load resistor 156 and the cathode of which is grounded through cathode resistor 157. The control grid of tube V4 is grounded. The magnitude of the current flow through tube V4 and hence the magnitude of the potential at point 154 is selected by varying the bias of resistor 157. Since the spacing between the workpiece and the cathode shoes is continuously adjusted to maintain the current through the electrolyte at a value determined by the potential at point 154, it will be seen that adjustable resistor 157 can be employed to set or select that spacing.

Vacuum tubes V2 and V3 serve as elements of a means for producing a potential at point 158 having a magnitude determined by the magnitude of the current flow through the electrolyte. Thus, the voltage developed across sensing resistor 139 is applied to the control grid of vacuum tube V2 through resistor 159, capacitor 160 serving to by-pass transients. Tube V2 is supplied with plate voltage through potentiometer 161, the resistive element of which serves as a plate load resistor, and the cathode of tube V2 is connected to ground through self-biasing resistor 162. The signal voltage developed acoss resistor 139 and applied to the control grid of tube V2 is negative in polarity and varies in magnitude in direct proportion to the magnitude of the current flow through the electrolyte. As a result, the magnitude of the current through tube V2 varies inversely with that electrolyte current and the value of the voltage applied to conductor 163 varies directly with the magnitude of the electrolyte current. The signal voltage on conductor 163 is applied to the control grid of vacuum tube V3, the anode of which is supplied with plate voltage through the left-hand portion of potentiometer 155 and through plate load resistor 164 and the cathode of which is maintained at a positive value relative to the control grid voltage by means of potentiometer 165.

The magnitude of the current through tube V3 varies directly with the magnitude of the current through the electrolyte and hence the potential at point 158 varies inversely with the magnitude of that electrolyte current. The signal voltage at point 158 is positive relative to ground but may be positive or negative relative to the potential at point 154 in accordance with whether the magnitude of the current through the electrolyte is less than or greater than it should be under the instant setting of potentiometer 157. If the potential at point 158 is positive relative to the potential at point 154, conventional current will flow through rectifier or unidirectional current conducting device 166 and the winding of relay F to energize that relay. Conversely, if the potential at point 158 is less than negative relative to the potential at point 154, conventional current will flow through rectifier 167 and the winding of relay R to energize relay R.

Relays F and R control the energization of winding W1 of motor M1 from a direct voltage source including transformer TR2 and the full wave rectifying bridge 168. If the "forward" relay F is energized, contacts Fa and Fb are closed. The closure of those contacts completes a circuit from the positive terminal of bridge 168, conductor 169, contact Fa, conductor 170, now-closed contact TD2a, winding W1, conductor 171, contact Fb, and conductor 172 to the negative terminal of bridge 168. Since winding W2 is continuously connected across the bridge 168, motor M1 is energized and will rotate in a direction to move the cathode shoes toward the workpiece. When this occurs, the magnitude of the electrolyte current will increase and the potential at point 158 will be reduced. When it is reduced sufficiently toward or to the value of the potential at point 154, relay F releases, contacts Fa and Fb open and the forward movement of the motor terminates. Conversely, if the spacing between the cathode shoes and the workpiece becomes too small, the potential at point 158 will become negative relative to the potential at point 154 and relay R will operate, closing contacts Ra and Rb. The closure of contacts Ra and Rb serves to connect winding W1 of motor M1 to bridge rectifier 168 in an opposite polarity to that previously described and accordingly motor M1 will operate in a reverse direction to move the cathode shoes further from the workpiece. When that distance has increased to the point at which the electrolyte current is reduced to a value to bring the potential at point 158 to or substantially to the value of the potential at point 154, relay R releases and energization of the motor M1 is terminated.

The equipment continues to operate in this manner, continuously maintaining the cathode shoes at a preselected spacing from the workpiece, until the size control device signals that the honing cycle is about to be terminated. At that time, down feed of the actuating rod 99 and cone element 97 is terminated in order to cause the stones 93 to run out against the workpiece in a manner well known in the art and the same condition causes the limit switch LS3 to be opened to deenergize time delay relays TD1 and TD2. These relays immediately open their contacts TD1a and TD2a, respectively, to deenergize the power supply 77 and to open the circuit of winding W1 of motor M1 to prevent further operation of that motor at this time.

*To obtain normal honing cross-hatch patterns, typical of honing operations without use of electrolytic action, the power supply 77 is de-energized a few seconds prior to termination of the honing cycle to allow for runout or finish honing the surface of the workpiece to provide a desired and consistent surface finish.*

When the run-out cycle is completed, the honing tool 67 is withdrawn from the workpiece and moved upwardly. When the tool is completely withdrawn, limit switches LS2a, LS2b and LS2c are tripped. The opening of limit switch LS2c terminates the energization of relay TD3. Relay TD3, however, maintains its contacts TD3a and TD3b closed for a preselected period. Consequently, the closure of limit switch LS2a completes a connection from the cathode of tube V3, closed contacts TD3a, limit switch LS2a and to the control grid of tube V3. This places tube V3 in a condition of zero bias, reducing the potential at point 158 to a low value relative to the potential at point 154 and causing relay R to be operated. Additionally, the closure of limit switch LS2b completes a connection also including contacts TD3b in shunt of the now-open contacts TD2a to enable the energizing circuit for winding W1 of motor M1 even though contacts TD2a are at this time open. As a result, winding W1 is energized in a direction to cause the motor M1 to reverse to contact the cathode shoes sufficiently to insure free insertion into the next workpiece. The duration of the reverse motion of the motor M1 is controlled by the delay period of relay TD3. At the end of that period, contacts TD3a open to terminate the interconnection of the control grid and cathode of tube V3 and contacts TD3b open to disable the energizing circuit for motor M1. The apparatus is now in condition to receive a new workpiece.

For test and setup purposes, a manually operable switch S1 may be provided to interconnect the control grid and cathode of tube V3 for contracting the cathode shoes and a manually operable switch S2 may be provided to interconnect the control grid and cathode of tube V4 to cause the cathode shoes to be expanded.

Figures 8, 10:
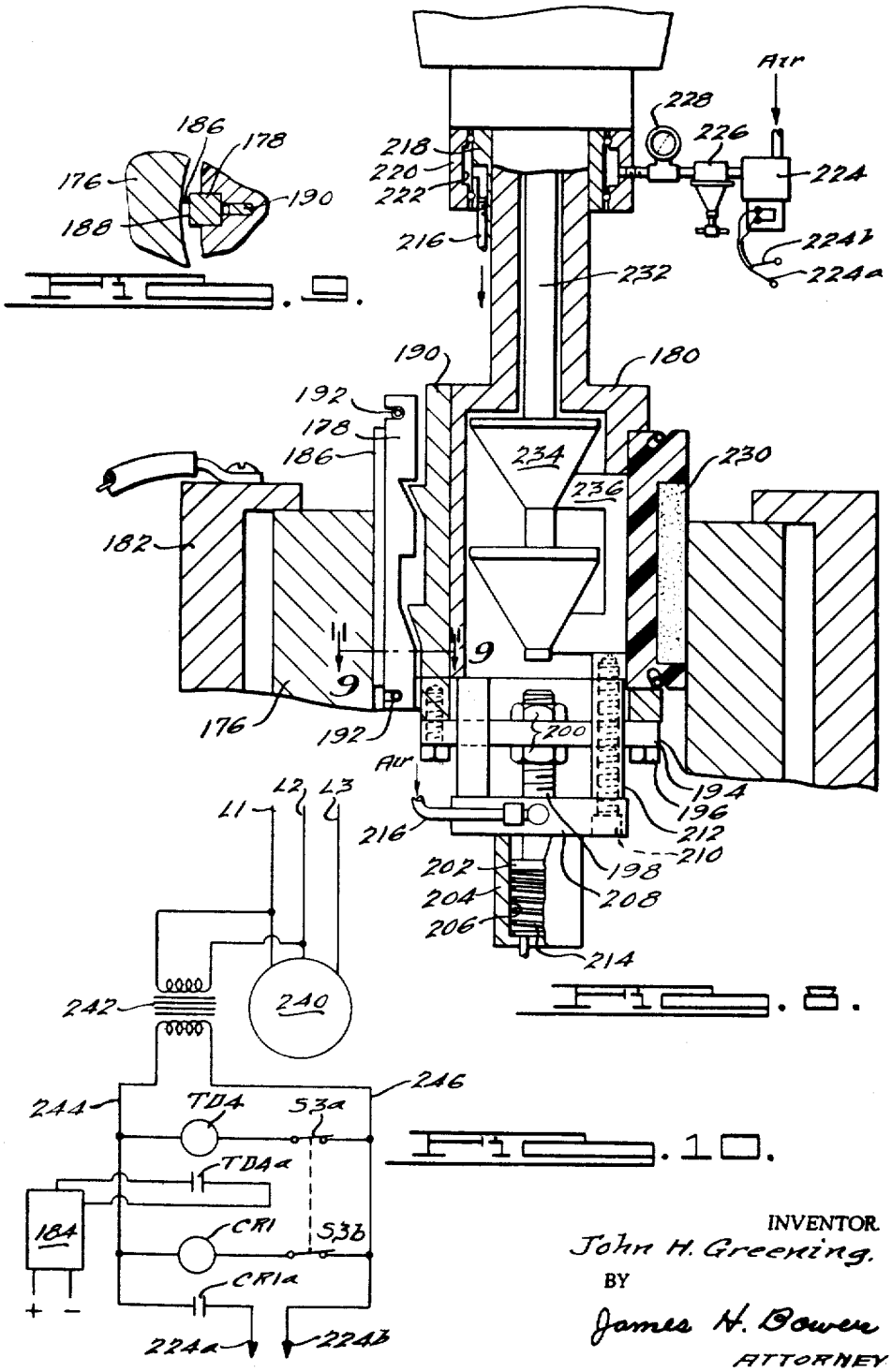
FIG. 8 is a longitudinal sectional view of structure illustrating a still further form of the present invention.
FIG. 10 is a schematic representation of a portion of the control circuitry for the structure illustrated in FIG. 8.

FIGS. 8, 9 and 10 illustrate another form of the subject invention by means of which a predetermined gap may be maintained between a workpiece 176 and a plurality of cathode shoes 178 arranged circumferentially about a honing tool body 180. As in the previous embodiments, the workpiece is held by an electrically conductive fixture 182, which is connected to an electrolytic power supply unit 184 for the passage of a direct electric current from the work through an electrolyte to the cathode shoes 178 and thence back to the power supply unit in a manner similar to that shown in the first embodiment. Each of the cathode shoes 178 is provided with an electrically nonconductive insulator or tab 186 bonded or otherwise secured along one margin of its outer face 188 and which is adapted to engage the work surface being honed during the operation of the machine. The shoes are radially expanded or advanced in and out by axial movement of cathode expansion members 190; and the shoes 178 are held in abutment with the expansion members 190 by a pair of garter springs 192. The lower ends of the expansion members 190 are secured to an actuating plate 194 by any suitable means, such as screws 196. A depending stud 198 is secured to the plate 194 by a pair of nuts 200, and is integrally joined at its lower terminus to a piston 202. The piston 202 reciprocates within a cup or cylinder 204 having a cylindrical inner wall surface 206. The cylinder 204 is carried by a supporting member 208 fixedly suspended from the honing tool body 180 by suitable fastening means, such as screws 210 and sleeves 212. The cathode expansion members 190 are normally biased upwardly by a spring 214 seated within the cylinder 204 and bear against the underside of the piston 202. The piston is adapted to be moved downwardly against the spring 214 under the influence of compressed air which is supplied to the upper portion of the cylinder 204 by a flexible air supply hose 216 which passes through the honing tool body 180 and is fitted at its upper end in an inner rotatable ring 218. The ring 218 is sealed with respect to a nonrotatable ring 220 and, together with the ring 220, forms a chamber 222 to which compressed air is supplied from a solenoid actuated air valve 224. A pressure regulator 226 and gauge 228 may be interposed between the solenoid valve and the chamber 222 for regulating the pressure with which the cathode shoes 178 will be expanded against the work and for providing visual means to check the magnitude of this pressure.

The honing tool illustrated in FIG. 8 is provided with the usual abrasive stones 230, which are adapted to be radially advanced by downward axial movement of an actuating rod 232 which effects downward movement of a double expansion cone element 234 engaging cam elements 236 in abutment with the abrasive stones 230. As the honing tool is rotated and reciprocated within the workpiece, the rod 232 is fed downwardly to compensate for the material abraded away from the face of the honing stones 230 and to increase the diameter of the cylindrical surface being honed. In addition, compressed air under a regulated pressure is supplied to the cylinder 204 to maintain the insulating tabs 186 of the cathode shoes 178 in engagement with the surface being honed but under a lesser pressure than that applied to the abrasive stones. The radial thickness of the insulating tabs 186 determines the gap between the outer face 188 and the work surface, which gap is filled with an electrolytic coolant by means such as that illustrated in the prior embodiments. Suitable nylon or ceramic materials can be used for the tabs 186 which will wear extremely well if the pressure with which they are held against the bore wall is not too great. The thickness of the tabs 186 determines the distance through which the electric current will flow in passing from the workpiece to the cathode shoes 178.

In the operation of the honing tool of this embodiment, the tool body 180 and its associated structure is moved into the workpiece with the abrasive stones 230 and cathode shoes 178 in a compressed or retracted position. At the bottom of the first stroke, downward axial movement of the actuating rod 232 is commenced to advance the honing stones 230 and rotation of the honing tool is also begun. FIG. 10 illustrates suitable circuitry for controlling the operation of the device at this point. A spindle motor 240, by which the honing tool is rotated, is supplied with three-phase current from leads L1, L2 and L3. A step-down transformer 242 has its primary winding connected to the leads L1 and L2 and its secondary winding serves to produce an alternating current between leads 244 and 246. At the beginning of the feed of the rod 232, a feed switch S3 is actuated by any suitable means and its contacts S3a and S3b are thereby closed to energize the windings of relays TD4 and CR1. The energization of relay CR1 produces closure of its contacts CR1a to energize the solenoid valve 224 through terminals 224a and 224b. The energization of relay TD4 will, after a time delay of several seconds, cause closure of its contacts TD4a to turn on the electrolytic power supply unit 184 and thereby initiate the flow of current from the workpiece 176 to the cathode shoes 178 through the electrolyte, which is now flowing through the gap between said members. The operation continues in this manner until the completion of the honing operation, at which time the switch S3 is actuated to open its contacts S3a and S3b, thus deenergizing the relays TD4 and CR1 and causing contacts TD4a and CR1a to open. By this means, the solenoid valve 224 is deenergized and the cathode shoes 178 will be retracted under the influence of the spring 214 and garter springs 192. In addition, the power unit 184 will be shut off to terminate the flow of current from the workpiece to the cathode shoes.

It will be seen that the form of the invention in FIGS. 4–7 and the form of the invention illustrated in FIGS. 8–10 both provide means for maintaining a constant gap between the work surface being honed and the nearest electrically conductive portions of the tool, despite the constantly changing size of the work surface. It has been found that when the cathode shoes or other electrically conductive portion of the tool body is maintained too close to the work surface, sparking and other undesirable effects are produced. If the gap is too large, insufficient etching of the work surface will result. It has therefore been found that the maintenance of a predetermined gap between the work surface and the honing tool will produce the most desirable results, particularly in the honing of a work surface in which the change in the size of the work surface from the unfinished to the finished state will exceed a certain amount.

While the embodiments of the invention illustrated herein are intended for use in finishing interior cylindrical surfaces, it should be appreciated that the invention is equally applicable to honing devices intended for the finishing of exterior surfaces and in which the honing stones are advanced in a radially inward direction to contact the work surface.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

[1. An abrading device for finishing metallic surfaces comprising:

(a) a tool body, (b) at least one electrically conductive cathode shoe carried by said body in confronting spaced relation to a portion of an anode work surface, (c) means for flowing an electrolyte between the work surface and said cathode shoe, (d) means for passing an electric current from said work surface to said cathode shoe through said electrolyte, (e) means for maintaining said conductive cathode shoe in fixed relation to the work surface as material is removed from said work surface, (f) abrasive means carried by said body in electrically non-conductive relation to said cathode shoe and engageable with a portion of said work surface other than that confronted by said body at any one time, (g) means for moving said abrasive means over the work surface to abrade the work surface, (h) means for moving said cathode shoe relative to said tool body, and (i) means for moving said abrasive means toward the work surface independently of said cathode shoe and relative to said tool body.]

[2. An abrading device for finishing metallic work surfaces as defined in claim 1, wherein:

(a) said maintaining means includes a substantially non-wearing insulating element carried by said cathode shoe.]

[3. An abrading device for finishing metallic work surfaces as defined in claim 2, wherein:

(a) said tool includes a honing tool having a body portion carrying a plurality of angularly spaced radially extending abrasive members, (b) means for radially expanding and contracting said abrasive members, (c) means for applying a radial force to said cathode shoe to maintain said insulating element in engagement with the work surface, and (d) means for radially expanding and contracting said abrasive members and said cathode shoe.]

[4. An abrading device for finishing metallic work surfaces as defined in claim 3, wherein:

(a) said means for radially expanding and contracting said abrasive elements includes a cam means operable to radially expand said abrasive elements against the work surface, (b) said means for applying a radial force to said cathode shoe includes a cam means operable to radially expand said cathode shoe against the work surface, and including, (1) means for axially moving said last-named cam means, and (2) means for limiting movement of said last-named means to maintain said cathode shoe in a predetermined spaced relation with an anode work surface.]

[5. An abrading device for finishing metallic work surfaces as defined in claim 1, wherein:

(a) said cathode moving means includes a means biasing said cathode shoe toward an anode work surface to maintain engagement with the work surface whereby a spacing is established between said cathode shoe and said work surface.]

[6. An abrading device for finishing metallic work surfaces as defined in claim 5, wherein:

(a) said means biasing said cathode shoe includes a means independent of movement of said abrasive means for radially adjusting said cathode shoe to maintain said cathode shoe in a substantially constant pre-selected spacing with the work surface.]

[7. An abrading device for finishing metallic work surfaces as defined in claim 6, wherein:

(a) said means biasing said cathode shoe includes a means responsive to the magnitude of said current for controlling said cathode shoe advancing means, whereby said cathode shoe is adapted to be in a constant pre-selected spatial relation with the work surface.]

[8. An abrading device for finishing metallic work surfaces as defined in claim 7, wherein:

(a) said means responsive to the magnitude of said current includes a sensing means for sensing said current, and including, (1) means for producing a signal whenever said current differs from a pre-selected value, and (2) means responsive to said signal for radially advancing said cathode shoe.]

[9. An abrading device for finishing metallic work surfaces as defined in claim 7, wherein:

(a) said means including said sensing means for producing a voltage signal whenever said current differs from a pre-selected value and having a polarity determined by the direction of the difference, and (b) means responsive to said signal for moving said cathode shoe radially and in a direction determined by the polarity of said signal.]

[10. An abrading device for finishing metallic work surfaces as defined in claim 1, wherein:

(a) said abrasive means includes a plurality of angularly spaced electrically non-conductive abrasive members carried by said tool body and projecting from said tool body toward said work surface.]

[11. An abrading device for finishing metallic work surfaces as defined in claim 1, wherein:

(a) said tool includes an electrically conductive hollow cathode body, (b) a plurality of angularly spaced abrasive members comprising bonded abrasive particles carried by said body and extending radially outwardly therefrom, said abrasive members being in electrically non-conductive relation to said body, (c) means for radially outwardly advancing said abrasive member, (d) means for passing an electrolytic coolant between said body and a workpiece surface forming an anode, and (e) means for passing a direct electric current from the surface of the workpiece to said body through said electrolytic coolant in locations intermediate said abrasive members.]

[12. An abrading device for finishing metallic work surfaces as in claim 11, wherein:

(a) said hollow cathode body having a substantially cylindrical outer contour and provided with circumferentially spaced recesses in the outer surface thereof, (b) a plurality of angularly spaced abrasive members carried by said honing tool in said recesses, said abrasive members being in electrically non-conductive relation to said body portion, and (c) means for advancing said abrasive members radially outwardly of said recesses and with respect to said body portion.]

*13. An abrading device for finishing metallic work surfaces by combined electrolytic action and abrasive means, including:*

*(a) an elongated tool body of cylindrical shape, being an electrically conductive cathode, adapted to lie in closely spaced confronting relation to an anode work surface, said cathode tool body having a contour and shape closely conforming to the contour and shape of the metallic work surface;*

*(b) a plurality of circumferentially spaced electrically nonconductive abrasive members carried by said cathode tool body and adapted to project from said cathode tool body toward said work surface;*

*(c) means for flowing electrolyte between said cathode tool body and said work surface;*

*(d) means for passing direct current from said work surface to said cathode tool body through said electrolyte in spaces between said abrasive members;*

*(e) means for axial reciprocation and rotation of said cathode tool body relative to said work surface in order to move said abrasive members over said work surface;*

*(f) means for moving said abrasive members relative to said cathode tool body toward said work surface;*

*(g) means for controlling said device over a predetermined abrading cycle including timing means for terminating said direct current at a predetermined interval, whereby said axial reciprocation and said rotation of said cathode tool body continues without conjoint electrolytic action; and,*

*(h) means for stopping said axial reciprocation and said rotation of said cathode tool body after a predetermined time has elapsed subsequent to said termination of said direct current.*

*14. A device for finishing bore wall surfaces of a workpiece by combined electrolytic action and abrasive means, comprising:*

*(a) a honing tool having a hollow body of substantially circular outer contour and provided with a plurality of longitudinally extending and circumferentially spaced slots on said honing tool body, said honing tool body being an electrically conductive cathode adapted to lie in closely spaced confronting relation to an anode workpiece bore wall surface;*

*(b) a plurality of radially extending circumferentially spaced electrically nonconductive honing stones carried by said cathode body in electrically nonconductive relation to said cathode body;*

*(c) means for advancing said honing stones radially outwardly of said slots and relative to said cathode body;*

*(d) means for providing electrolyte between said anode workpiece bore wall surface and said cathode body;*

*(e) means for passing direct electric current from said workpiece bore wall surface to said cathode body through said electrolyte in spaces between said honing stones;*

*(f) means for axial reciprocation of said cathode body with respect to said bore wall surface to move said honing stones over said bore wall surface;*

*(g) means for rotation of said cathode body relative to said workpiece bore wall surface;*

*(h) means for controlling said device over a predetermined honing cycle including timing means for terminating said direct electric current at a predetermined time interval, whereby said axial reciprocation and said rotation of said cathode body continues without conjoint electrolytic action; and,*

*(i) means for terminating said axial reciprocation and said rotation of said cathode body after a predeter-*

*mined time has elapsed subsequent to said termination of said direct electric current.*

*15. An abrading device for finishing metallic suraces by combined electrolytic action and abrasive means, comprising:*

*(a) a tool body, said tool body having a contour and shape closely conforming to the contour and shape of an anode work surface;*

*(b) at least one electrically conductive cathode shoe carried by said body in confronting spaced relation to a portion of an anode work surface;*

*(c) means for flowing an electrolyte between the work surface and said cathode shoe;*

*(d) means for passing an electric current from said work surface to said cathode shoe through said electrolyte;*

*(e) means carried by said cathode shoe for maintaining said conductive cathode shoe in fixed relation to the work surface as material is removed from said work surface;*

*(f) abrasive means carried by said body in electrically non-conductive relation to said cathode shoe and engageable with a portion of said work surface other than that confronted by said body at any one time;*

*(g) means for reciprocating said tool body over the work surface to abrade the work surface;*

*(h) means for rotating said tool body relative to said work surface;*

*(i) means for moving said cathode shoe radially inwardly and outwardly relative to said tool body and independently of said abrasive means; and,*

*(j) means for moving said abrasive means radially inwardly and outwardly relative to said total body and independently of said cathode shoe.*

*16. An abrading device for finishing metallic work surfaces as defined in claim 15, wherein:*

*(a) said maintaining means includes a substantially non-wearing insulating element carried by said cathode shoe.*

*17. An abrading device for finishing metallic work surfaces as defined in claim 16, wherein:*

*(a) Said tool includes a honing tool having a body portion carrying a plurality of angularly spaced radially extending abrasive members,*

*(b) means for radially expanding and contracting said abrasive members,*

*(c) means for applying a radial force to said cathode shoe to maintain said insulating element in engagement with the work surface, and*

*(d) means for radially expanding and contracting said abrasive members and said cathode shoe.*

*18. An abrading device for finishing metallic work surfaces as defined in claim 17, wherein:*

*(a) said means for radially expanding and contracting said abrasive elements includes a cam means operable to radially expand said abrasive elements against the work surface,*

*(b) said means for applying a radial force to said cathode shoe includes a cam means operable to radially expand said cathode shoe against the work surface, and including,*

*(1) means for axially moving said last-named cam means, and*

*(2) means for limiting movement of said last-named means to maintain said cathode shoe in a predetermined spaced relation with an anode work surface.*

*19. An abrading device for finishing metallic work surfaces as defined in claim 15, wherein:*

*(a) said cathode moving means includes a means biasing said cathode shoe toward an anode work surface to maintain engagement with the work surface whereby a spacing is established between said cathode shoe and said work surface:*

*20. An abrading device for finishing metallic work surfaces as defined in claim 19, wherein:*

*(a) said means biasing said cathode shoe includes a means independent of movement of said abrasive means for radially adjusting said cathode shoe to maintain said cathode shoe in a substantially constant preselected spacing with the work surface.*

*21. An abrading device for finishing metallic work surfaces as defined in claim 20, wherein:*

*(a) said means biasing said cathode shoe includes a means responsive to the magnitude of said current for controlling said cathode shoe advancing means, whereby said cathode shoe is adapted to be in a constant preselected spatial relation with the work surface.*

*22. An abrading device for finishing metallic work surfaces as defined in claim 21, wherein:*

*(a) said means responsive to the magnitude of said current includes a sensing means for sensing said current, and including,*

*(1) means for producing a signal whenever said current differs from a preselected value, and*

*(2) means responsive to said signal for radially advancing said cathode shoe.*

*23. An abrading device for finishing metallic work surfaces as defined in claim 21, wherein:*

*(a) said means including said sensing means for producing a voltage signal whenever said current differs from a preselected value and having a polarity determined by the direction of the difference, and*

*(b) means responsive to said signal for moving said cathode shoe radially and in a direction determined by the polarity of said signal.*

*24. An abrading device for finishing metallic work surfaces as defined in claim 15, wherein:*

*(a) said abrasive means includes a plurality of angularly spaced electrically non-conductive abrasive members carried by said tool body and projecting from said tool body toward said work surface.*

*25. An abrading device for finishing metallic work surfaces as defined in claim 15, wherein:*

*(a) said tool includes an electrically conductive hollow cathode body,*

*(b) a plurality of angularly spaced abrasive members comprising bonded abrasive particles carried by said body and extending radially outwardly therefrom, said abrasive members being in electrically nonconductive relation to said body,*

*(c) meas for radially outwardly advancing said abrasive member,*

*(d) means for passing an electrolytic coolant between said body and a workpiece surface forming an anode, and*

*(e) means for passing a direct electric current from the surface of the workpiece to said body through said electrolytic coolant in locations intermediate said abrasive members.*

*26. An abrading device for finishing metallic work surfaces as in claim 25, wherein:*

*(a) said hollow cathode body having a substantially cylindrical outer contour and provided with circumferentially spaced recesses in the outer surface thereof,*

*(b) a plurality of angularly spaced abrasive members carried by said honing tool in said recesses, said abrasive members being in electrically non-conductive relation to said body portion, and*

*(c) means for advancing said abrasive members radially outwardly of said recesses and with respect to said body portion.*

References Cited

The following references, cited by the Examiner, are of record in the patented file of this patent or the original patent.

UNITED STATES PATENTS

| | | | |
|---|---|---|---|
| 2,746,917 | 5/1956 | Comstock | 204—143 |
| 2,764,540 | 9/1956 | Farin et al. | 204—224 |
| 2,805,197 | 9/1957 | Thibault et al. | 204—143 |
| 2,826,540 | 3/1958 | Keeleric | 204—143 |
| 3,022,232 | 2/1962 | Bailey et al. | 204—26 |
| 3,061,529 | 10/1962 | Crompton | 204—143 |
| 2,191,256 | 2/1940 | Dunbar et al. | 51—342 |
| 2,343,500 | 3/1944 | Fairbairn et al. | 51—343 |

| | | | |
|---|---|---|---|
| 2,757,488 | 8/1956 | Greenberg | 51—340 |
| 3,267,018 | 8/1966 | Greening | 204—143 |

OTHER REFERENCES

Webster's New International Dictionary, second edition, G. & C. Merriam Co., publ., Springfield, Mass., 1958, p. 1195 relied upon.

V. N. Guesev; Nanka I. Zhizn, 1954, vol. 21, No. 12.

Keeleric: Steel, vol. 130, No. 30, pp. 84-86, March 1952.

ROBERT K. MIHALEK, *Primary Examiner.*